United States Patent [19]
Mohn

[11] 4,019,984
[45] Apr. 26, 1977

[54] CONTINUOUS FILTER WITH PRESSING MEANS

[75] Inventor: Helmuth Mohn, Dutenhofen, Germany

[73] Assignee: Gesellschaft fur Strahlen- und Umweltforschung mbH, Munich, Germany

[22] Filed: Apr. 14, 1975

[21] Appl. No.: 568,128

[30] Foreign Application Priority Data

Apr. 13, 1974  Germany .................... 2418189

[52] U.S. Cl. ........................... 210/66; 100/37; 100/116; 100/127; 100/218; 210/86; 210/87; 210/100; 210/137; 210/352; 210/408; 210/523

[51] Int. Cl.[2] ............... B01D 37/04; C02B 3/02

[58] Field of Search .......... 210/350, 224, 351, 225, 210/352, 226, 476, 357, 131, 250, 65, 137, 66, 408, 85, 86, 87, 97, 100, 523; 100/126, 127, 218, 116, 37

[56] References Cited

UNITED STATES PATENTS

| | | | |
|---|---|---|---|
| 477,023 | 6/1892 | Seiffert | 100/116 |
| 525,023 | 8/1894 | Meyer | 100/127 |
| 1,034,207 | 7/1912 | Corbett | 100/127 |
| 1,307,965 | 6/1919 | Fowler | 100/127 |
| 1,435,790 | 11/1922 | Bachman | 210/137 |
| 2,937,754 | 5/1960 | Kasten | 210/131 |
| 3,021,254 | 2/1962 | Helversen et al. | 100/127 |
| 3,144,819 | 8/1964 | Riddell | 100/127 |
| 3,168,033 | 2/1965 | Hansen | 100/179 |
| 3,517,816 | 6/1970 | Hoppen | 210/352 |
| 3,550,775 | 12/1970 | Cooley | 100/127 |
| 3,921,511 | 11/1975 | Gall | 100/126 |

FOREIGN PATENTS OR APPLICATIONS

| | | |
|---|---|---|
| 1,073,926 | 1/1960 | Germany |
| 2,254,860 | 11/1972 | Germany |
| 1,436,296 | 9/1963 | Germany |

Primary Examiner—Frank W. Lutter
Assistant Examiner—Frank Sever
Attorney, Agent, or Firm—Spencer & Kaye

[57] ABSTRACT

A method is provided for continuously filtering liquids containing microorganisms, macromolecules and/or fine particles of solid matter as substances to be filtered out and collecting the substances that are filtered out. The liquid to be filtered is introduced from the top into an upright sieve basket where the filtrate is separated from the substances to be filtered out. A pressure is exerted on the liquid in the sieve basket by pressing means so that the filtrate leaves the sieve basket and the entire surface of the cake formed from the filtered-out substances always has approximately the same height in the sieve basket. The liquid in the sieve basket is pressed under an increasable counterpressure into the space underneath the pressing means in the sieve basket. When the backpressure of the liquid is higher than the pressure of the pressing means on the liquid, the pressing means is lifted a small distance above the cake in the sieve basket.

The apparatus for practicing the method includes a housing, and a sieve basket which is mounted in the housing, with the sieve basket being open at its top and bottom and situated on or closely above a cover for the housing. An axially movable disc is mounted in the sieve basket and divides the sieve basket into a lower chamber, which receives the liquid to be filtered, and an upper chamber, which is sealed from the lower chamber. An inlet line is provided into the housing and is connected to at least one bore in the disc to bring the liquid to be filtered into the lower chamber. Force applying means acts on the disc and together with the disc constitute a pressing means which exerts pressure on the liquid in the lower chamber of the sieve basket.

21 Claims, 2 Drawing Figures

CONTINUOUS FILTER WITH PRESSING MEANS

BACKGROUND OF THE INVENTION

The present invention relates to a method and apparatus for continuously filtering liquids containing microorganisms, macromolecules and/or fine particles of solid matter as the substances to be filtered out and collecting the substances that are filtered out.

A method and apparatus for filtering liquids containing microorganisms, macromolecules or fine particles of solid matter are disclosed in German Offenlegungsschrift No. 22 54 860. In the method disclosed in this publication, the liquid to be filtered is moved parallel to a filter surface made of a membrane filter having a smooth surface. The static pressure acting perpendicularly on the filter surface is kept lower than a column of water of three meters and a force acts on the particles in the liquid parallel to the filter surface which force is determined by a suitable selection of the flow speed. This force is higher than the contact friction of the particles against the membrane filter caused by the static pressure and maintains a laminar flow at the filter surface. The apparatus for practicing this method includes at least one vessel for the liquid to be filtered, a circular pump connected with that vessel via a pipeline, at least one filter element connected with the pump via a pipeline, and a pipeline leading back from the pump to the vessel. The filter element has a rectangular inner cross section, the direction of flow is horizontal, and the two vertical sides of the rectangle are formed by membrane filters. A drawback of this method and the apparatus used to practice the method, among other things, is that, after filtration, the collected substances are not present as an almost solid cake and cannot be moved from the device as a unit.

In another prior art system, a bag filter, which is designed for high pressure, is disclosed in German Auslegeschrift No. 1,436,296, and includes a rigid, approximately cylindrical, housing having a major axis in approximately the vertical plane, an easily openable cover attached to the housing, a filter bag fastened with its open, lower end to a flange of the housing, and a rigid, liquid-permeable support enveloping the filter bag. The apparatus also includes an inlet line for conducting the liquid to be filtered into the filter bag, an outlet line for conducting the filtrate away from a filtrate chamber, and a device for turning the filter bag inside out for the purpose of cleaning it when a cover is removed. A substantially closed, impermeable hollow membrane body is disposed inside the filter bag and can be connected to a hydraulic pressure medium and blown up to approximately the size of the filter bag. The lower, open end of this hollow membrane body has a removable cover and is connected to a pipe. The filtrate chamber forming an annular chamber between the filter bag and the housing can also be brought into communication with pressurized air or a vacuum through blockable lines. A significant drawback of this device is its discontinuous and complicated mode of operation. If the housing is filled with liquid to be filtered, it is closed and the hollow membrane body increases its volume so that the filtrate is separated from the filtering residue. The residue then fills only a minor portion of the filter bag volume and must be removed from the bag by turning the bag inside out.

In still another prior art system, an apparatus for filtering liquids of the type S 100 is produced by E. Dinglinger KG, Bremen. This apparatus employs a sieve basket which is open at its top and is disposed vertically in a housing. The liquid to be filtered is introduced from the top into the sieve basket, the filtrate is sucked out and the filter residue remains in the sieve basket as sludge. The drawback of this apparatus is that the filter residue of difficultly filtrable media, such as, algae and other microorganisms, is left in the sieve basket as a sludge or mud and not as a solid cake. The surface of the sludge in the sieve basket assumes a paraboloid shape. The removal of the filtered residue generally requires complicated removal of the sieve basket from the housing followed by complicated cleaning of the sieve basket.

SUMMARY OF THE INVENTION

It is a primary object of the present invention to provide a method and apparatus which enable microorganisms, macromolecules and/or fine particles of solid matter to be completely filtered from liquids.

Another object of the present invention is to provide a method and apparatus for filtering liquids wherein the substances are collected in such a manner that they will be present as a cake in almost solid form and can be removed from the filter used in the apparatus in a most simple manner.

A further object of the present invention is to provide a method and apparatus for filtering liquids wherein the filter chamber is filled in as homogeneous a manner as possible so that the filter pores or filter openings of the filter, respectively, do not become clogged before the filter chamber has been filled with the substances that have been filtered out.

A still further object of the invention is to provide a method and apparatus for filtering liquid wherein the filter cake formed from the substances that are filtered out contains as little as possible of the filtrate liquid.

An additional object of the invention is to provide a method and apparatus wherein manual cleaning of the apparatus is eliminated and replaced by return-flow rinsing.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and, in accordance with its purpose, as embodied and broadly described, the present invention provides a method for continuously filtering liquids containing microorganisms, macromolecules and/or fine particles of solid matter as substances to be filtered out and collecting the substances that are filtered out in the form of a filter cake, which comprises introducing the liquid to be filtered from the top into an upright sieve basket where the filtrate is separated from the substance to be filtered out; exerting pressure on the liquid in the sieve basket by pressing means so that the filtrate leaves the sieve basket and the entire surface of the cake formed from the filtered-out substances, at any given time, always has approximately the same height in the sieve basket; pressing the liquid under an increasable counter-pressure into the space underneath the pressing means in the sieve basket; and lifting the pressing device a small distance above the cake in the sieve basket when the backpressure of the liquid is higher than the pressure of the pressing means on the liquid.

Preferably, the pressing means can additionally be used, when the lower opening of the sieve basket is opened and exposed, to press the finished cake out of the sieve basket.

In another aspect of the invention, an apparatus for practicing the method of the invention is provided and comprises a housing having a shell, a bottom cover closing the bottom of the shell, and a top cover closing the top of the shell; a sieve basket mounted in the housing for receiving the liquid to be filtered in its interior, the sieve basket being open at its top and bottom and situated on or closely above the bottom of the housing, the sieve basket forming a filtrate chamber with the housing; an axially movable disc mounted in the sieve basket and dividing the interior of the sieve basket into a lower chamber, which receives the liquid to be filtered, and an upper chamber, which is sealed from the lower chamber, the disc having a bore for passage of the liquid to be filtered into the lower chamber; an inlet line entering into and mounted in the housing, the inlet line being connected to the bore for bringing the liquid to be filtered into the lower chamber of the sieve basket; and force applying means acting on the disc which, together with the disc, comprise pressing means which exert pressure on the liquid in the lower chamber of the sieve basket.

Preferably, the bore is provided with a valve which blocks the inlet line if the backpressure of the liquid and of the filtered substances in the sieve basket below the disc is equal to or higher than the pressure of the pressing means.

Preferably, the disc is mounted in the sieve basket on bearings. The housing preferably has a shoulder at its lower end, the sieve basket has a collar disposed around its lower opening, and a seal is mounted on the bottom cover of the housing, with the sieve basket collar contacting the shoulder and seal so that the filtrate chamber of the housing is separated and sealed from the interior of the sieve basket between the disc and lower cover of the housing. It is also preferred that spacer elements be provided to hold the sieve basket in the housing.

In one embodiment of the present invention, a contact sensor preferably is mounted at the upper cover of the housing and is actuated by a contact pin fastened to the disc to stop the inflow of liquid at a given height of the filter cake.

In a particularly advantageous embodiment of the apparatus of the present invention, the lower cover of the housing is pivotally mounted to the shell and can be pivoted to expose the lower opening of the sieve basket. It is also preferred that the disc be provided with outer dimensions which correspond approximately to the inner dimensions of the sieve basket and that bearings be provided for the disc. Preferably, the bearings comprise guide elements, such as rollers or pins, which run in guide grooves in the side wall of the sieve basket. It is further preferred that the disc have a lower edge which faces the collar of the sieve basket, that a shield for sealing the disc is fastened to the lower edge, and that a circular scraper is provided at the lower edge.

In a further embodiment of the apparatus of the present invention, the pressing means comprises the disc itself and force applying means, such as springs, telescopes or hydraulic plungers, which are fastened to the upper cover of the housing and act as pressing elements.

In a further embodiment of the present invention, a center screen can be fastened in the sieve basket and the disc provided with an additional opening through which passes the center sieve. A shield and scraper for the center sieve preferably are provided around the additional opening in the disc.

It is to be understood that both the foregoing general description and the following detailed description are exemplary, and explanatory, but are not restrictive of the invention.

BRIEF DESCRIPTION OF THE DRAWINGS

The accompanying drawings, in which like numbers indicate like parts, illustrate examples of presently preferred embodiment of the invention and, together with the description, serves to explain the principles of the invention.

DETAILED DESCRIPTION OF THE INVENTION

Figure 1:
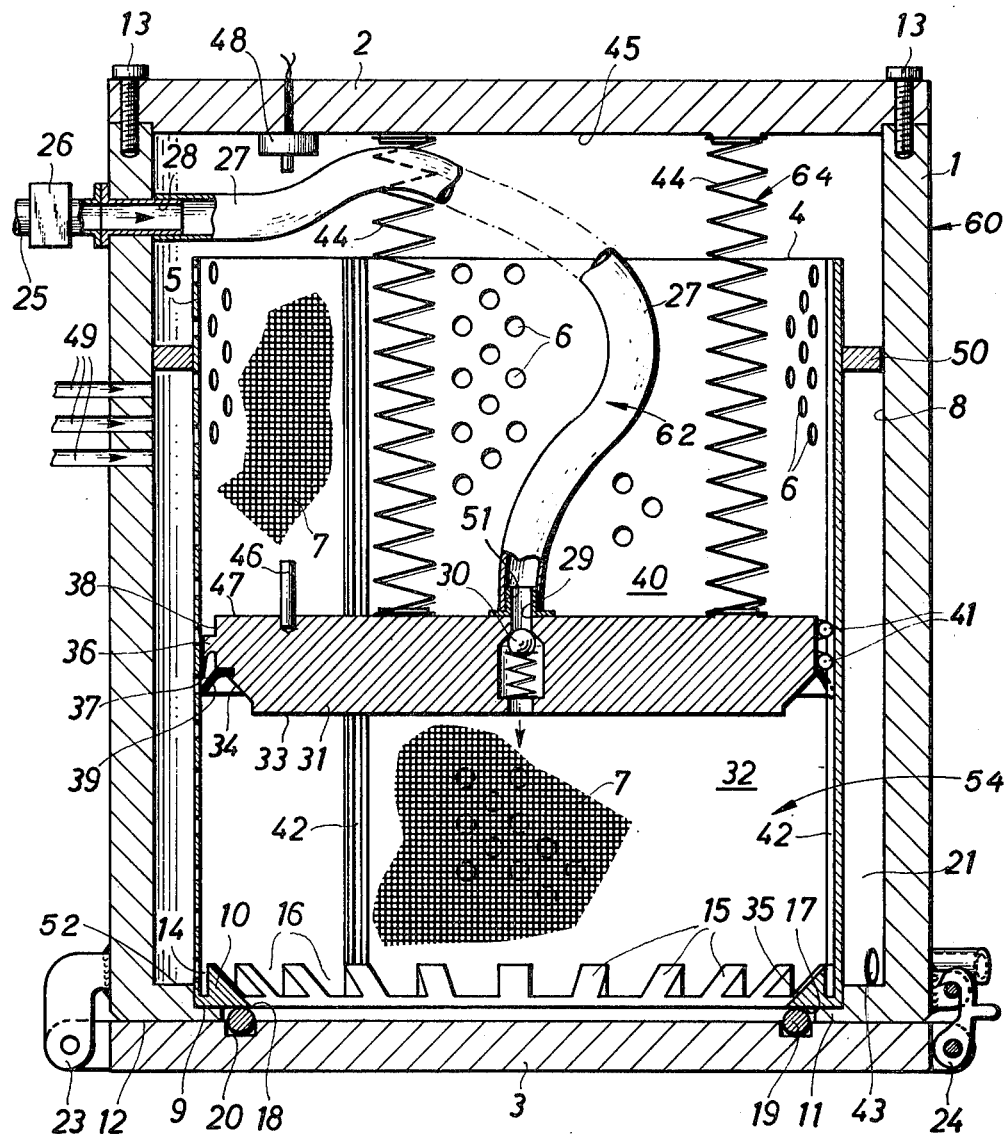
FIG. 1 is a sectional view of an apparatus made in accordance with the teachings of the present invention and which can be used to practice the method of the present invention.

Referring to the FIG. 1, there is shown a housing, generally 60, comprised of a cylindrical shell 1, which is open at its top and bottom, an upper cover 2 which can be screwed on tight to the top of shell 1 via screws 13 to close the top of shell 1, and a lower cover 3 which is attached to the bottom of shell 1 to close the bottom of the shell. Lower cover 3 of housing 60 is attached to the bottom of shell 1 via a hinge 23 and can be pivotally moved away from the interior of housing 60 on hinge 23 to open the housing. A locking means, here shown in the form of a magnetic lock 24, normally locks lower cover 3 to shell 1 and can be opened to permit lower cover 3 to be pivoted on hinge 23. Shell 1 has an inner wall 8 and contains an inwardly extending flange 52 at its lower end. Flange 52 terminates in a shoulder 11 which faces toward the interior of housing 60. The upper surface of lower cover 3 has a circularly extending groove 20 adjacent the end of flange 52. A circular seal 19, such as a rubber ring, seats in groove 20.

A sieve basket, generally 4, is mounted in housing 60 and receives the liquid to be filtered in its interior, generally 54. Sieve basket 4 is open at its top and bottom where it has a bottom opening 18. Sieve basket 4 includes a fixed cylindrical jacket 5 provided with openings 6 for the passage of filtrate. A number of openings 6 are illustrated in the drawing. The space between the outer surface of jacket 5 and inner wall 8 of shell 1 defines an annular filtrate chamber 21 which receives filtrate that passes from the interior of sieve basket 4 through openings 6.

The inner surface of jacket 5 is covered with a filter screen 7 which is made of steel or of textiles and has a given pore size. Sieve basket 4 is held with respect to inner wall 8 of shell 1 by spacers or rings 50 which are distributed over the outer periphery of jacket 5. Jacket 5 has a lower frontal face 9 which is fashioned into a collar 10 which rests on shoulder 11 of shell 1. Shoulder 11 prevents sieve basket 4 from dropping out of housing 60 when lower cover 3 is opened. Sieve basket 4, however, can be lifted out of housing 60 when upper cover 2 is removed or opened by removing or opening screws 13.

Collar 10 at lower frontal face 9 of jacket 5 is wedge-shaped in part and provided with a clearance 14 with respect to the cylindrical side wall of jacket 5. Collar 10 can include spaced individual sections 15 which form openings 16 which extend toward filter 7. Sections 15 have an inclined surface 35 which gives collar 10 its wedge shape. Collar 10 has a lower frontal face 17 which is designed to extend into the lower opening 18 of sieve basket 4 to such an extent and at such a low level that it rests on circular seal 19. Circular seal 19 seals filtrate chamber 21 of housing 60 against the interior 54 of sieve basket 4 as well as against the enviroment.

In accordance with the invention, an axially movable disc 31 is mounted in sieve basket 4 and divides the interior 54 of the sieve basket into a lower chamber 32, which receives the liquid to be filtered, and an upper chamber 40. Lower chamber 32 is defined by disc 31, lower cover 3 of housing 60 and jacket 5. Disc 31 is made of steel, for example, or some other heavy material, and has outer dimensions which approximately correspond to the inner diameter of sieve basket 4. Disc 31 contains a lower edge 33 which is flattened at its outer periphery in such a manner to provide a flattened surface 34 which has a plane that overlies and is parallel to the plane of inclined surface 35 of collar 10 so that disc 31 can rest on collar 10 when disc 31 is in its lowermost position in sieve basket 4.

Outer surface 34 of disc 31 is provided with a circular scraper 36 which has a tip 37 that can scrape axially along filter screen 7 on jacket 5 when disc 31 moves. Scraper 36 thus scrapes off material that might be disposed on filter screen 7. Further, a shield 39 of flexible material is provided at outer surface 34 of disc 31. Shield 39 slides along sieve basket 4 and separates and seals lower chamber 32 from upper chamber 40. Jacket 5 of sieve basket 4 contains vertically extending grooves 42 at its inner surface. Grooves 42 receive bearings 41 which contact disc 31 at outer peripheral surface 38 of disc 31. Bearings 41 are either uniformly distributed around disc 31 or are in a diametrally opposed arrangement around disc 31. Bearings 41 serve to keep disc 31 from tilting when it moves up and down in sieve basket 4.

Disc 31 contains a bore 29 at its center for passage of the liquid to be filtered into lower chamber 32. It is not absolutely necessary to arrange bore 29 in the center of disc 31, and more than one bore 29 can be provided in disc 31 so that liquid can enter chamber 32 at various points within the chamber. Bore 29 contains a check valve 30 which prevents liquid that has reached chamber 32 from flowing out of the chamber through bore 29.

An inlet line, generally 62, enters into and is mounted in housing 60 and is connected to bore 29 to bring the liquid to be filtered to lower chamber 32. Inlet line 62 includes a fitting 28 which extends through the side wall of shell 1 of housing 60 at a point above sieve basket 4, a product feed line 25 connected to fitting 28 outside of shell 1, and a flexible pressure hose 27 which is connected at one of its ends to fitting 28 and at its other end to bore 29 through a fitting 51 attached to the upper surface of disc 31. Product feed line 25 contains a control valve 26 which enables the feed of the liquid to be filtered to be controlled. The liquid to be filtered is pumped by a pressure pump (not shown), such as a piston or membrane pump, through product feed line 25 into hose 27 and then into lower chamber 32. When disc 31 contains more than one bore 29, flexible pressure hose 27 is divided into a plurality of individual hoses which are distributed over the diameter of disc 31 to homogeneously and uniformly distribute the liquid to be filtered to lower chamber 32.

Force applying means, generally 64, acts on the upper surface 47 of disc 31 and, together with disc 31, comprises a pressing means which exerts pressure on the liquid in lower chamber 32 of sieve basket 4. As shown in the drawing, the force applying means 64 comprises spring elements 44 which are attached at one end to upper surface 47 of disc 31 and at their other end to upper cover 2 of housing 60.

In a preferred embodiment of the invention, as shown in FIG. 1, a contact pin 46 is provided on upper surface 47 of disc 31. A contact sensor 48 is mounted to upper cover 2 of housing 60 and aligned with contact pin 46.

In operation of the apparatus, liquid to be filtered is pumped into lower chamber 32 of sieve basket 4 through pressure hose 27 and is deposited at lower cover 3 of lower chamber 32. Sealing ring 19 prevents leakage of the liquid out of the bottom of housing 60. The liquid flows through openings 6 in jacket 5 and, in so doing, the substances to be filtered out are caught by filter screen 7 so that the liquid leaves lower chamber 32 as a filtrate and enters into annular chamber 21 where it flows out of housing 60 through a filtrate outlet 43 in shell 1. The filtrate can also be sucked out of outlet 43. Disc 31 is pressed with a certain pressure from its own weight and/or from pressure caused by force applying means 64, such as spring elements 44 or telescopes or hydraulic plungers, against the liquid to be filtered which is in lower chamber 32. The force of spring elements 44 is set to be uniformly distributed over disc 31. The force of spring elements 44 and the weight of steel disc 31 together produce a precisely defined pressure which is the same in every position of disc 31 with respect to sieve basket 4. Thus, when disc 31 is at a certain height, every portion of disc 31 will exert the same amount of pressure on lower chamber 32. Of course, as the height of disc 31 in sieve basket 4 changes, the pressure of disc 31 on lower chamber 32 will change.

The filtrate flows through filter 7 into the annular chamber 21 of housing 60. During the filtration process, a cake collects in the interior of lower chamber 32 of sieve basket 4. For reasons of simplicity, this cake is not illustrated. As the cake builds up, the pressure which must be exerted by the pressure pump (not shown) used to pump the liquid to be filtered through inlet line 62 increases to enable the liquid to be filtered to be pressed through the filter cake. Finally, when the pump pressure increases to a value, such as 15 atmospheres, which is greater than that given by spring elements 44 and the weight of disc 31, disc 31 rises a small distance toward the top of housing 60 as a result of the greater pressure in lower chamber 32. Check valve 30 in bore 29 prevents the liquid and substances to be filtered that are in lower chamber 32 from feeding back into inlet line 62. During upward movement of disc 31, lower chamber 32 increases in height so that additional fresh areas of filter screen 7 come into lower chamber 32 and are exposed to the liquid in lower chamber 32. At these additional freshly exposed areas, the filtrate can again flow easily into annular filtrate chamber 21. This process of having disc 31 rise is repeated until contact pin 46 (or some other suitable signalling element) provided at top surface 47 of disc 31 actuates contact sensor 48 at top cover 2 of housing 60. Contact sensor 48 then shuts off the pump via a signalling line (not shown) and closes valve 26 in product feed line 25.

At any given time and position of disc 31 in sieve basket 4, the entire top surface of the cake formed from the filtered out substances is of approximately uniform height so that each point of the surface of the cake has the same approximate height. As disc 31 moves upwardly in sieve basket 4, the height of the filter cake increases, with each point of the surface having approximately the same increased height.

When sieve basket 4 becomes filled with filtered out substances to a desired level, the resulting cake of filtered substances or filtrate residue can be easily removed from sieve basket 4 or from housing 1. For this purpose, magnetic lock 24 is opened and lower cover 3 of housing 60 is pivoted downwardly. The cake then drops through the lower opening 18 of sieve basket 4 and out the bottom of housing 60. When lower cover 3 is opened, disc 31 begins moving downwardly and, in addition, scraper 36 on disc 31 presses the cake downwardly and removes even the last larger pieces of the cake from sieve basket 4.

To completely clean sieve basket 4 or its filter screen 7, rinsing agents may be sprayed into annular filtrate chamber 21 through sensing elements in the form of openings 49 disposed in the wall of shell 1 so as to spray free holes 6 and pores in filter screen 7. This final rinsing can take place with housing 60 being closed by closing lower cover 3 or can take place with housing 60 being open. The rinsing system can also be disposed at top cover 2.

Figure 2:
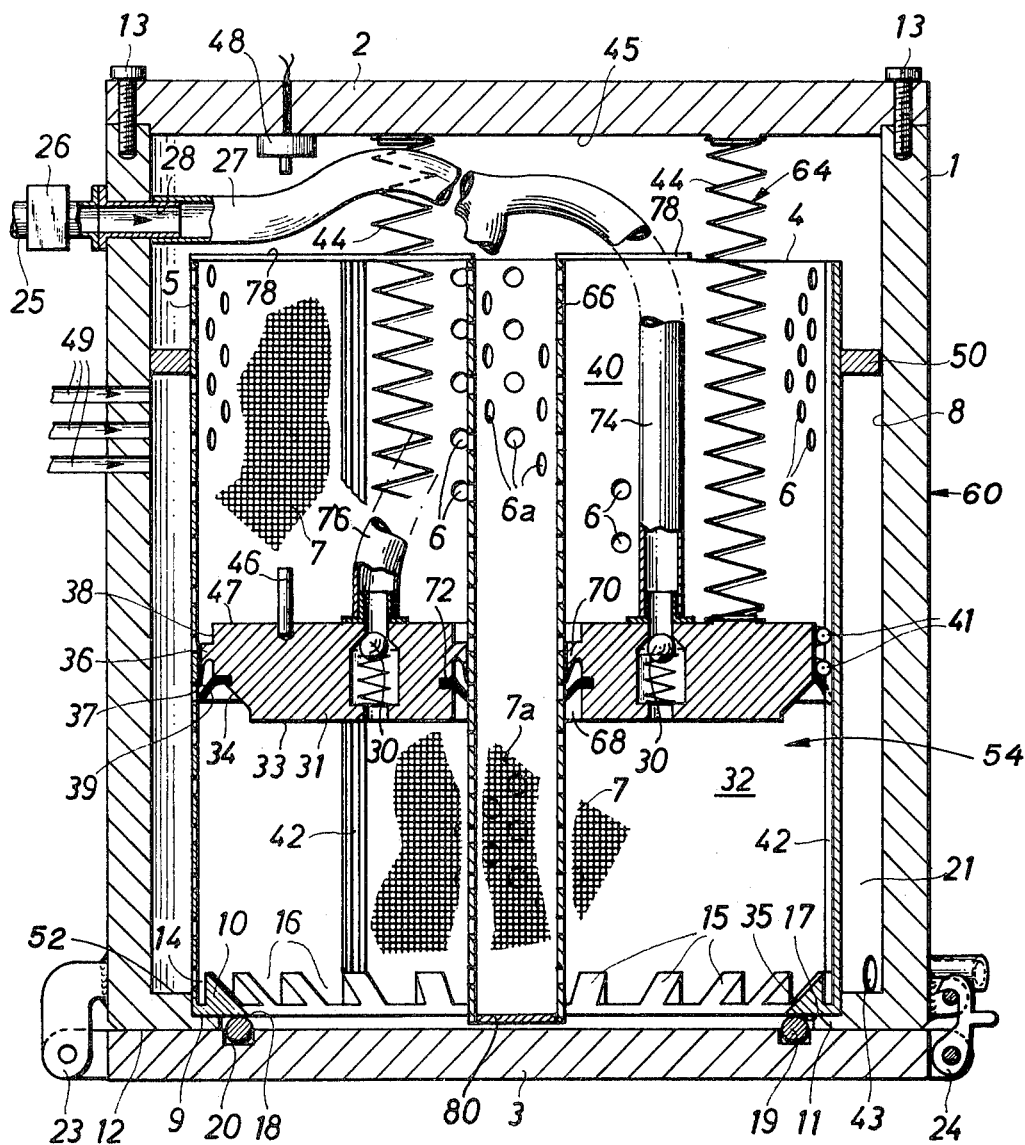
FIG. 2 is a sectional view of an apparatus like that of FIG. 1 but with a center screen.

If for certain reasons, a sieve basket 4 like that of FIG. 1 having a center filter screen 66 is required (See FIG. 2), disc 31 must be designed so that it has an additional opening 68 through which this center screen 66 can pass. This center screen 66 being closed at one end with a bottom 80 is sealed with respect to disc 31 again by means of an additional scraper 70 and an additional shield 72. Pressure hose 27 is then connected over the entire disc 31 and devided into two hoses 74 and 76 which end at two equal valves 30. Moreover, the center screen 66 must be held in its position with respect to the outer screen 5, which may be effected by struts 78 at the upper portion of the sieve basket or jacket 5, respectively. The center screen 66 has also openings 6a and a filter 7a.

It will be understood that the above description of the present invention is susceptible to various modifications, changes and adaptations, and the same are intended to be comprehended within the meaning and range of equivalents of the appended claims.

What is claimed is:

1. Method for continuously filtering liquids containing microorganisms, macromolecules and/or fine particles of solid material as substances to be filtered out and collecting the substances that are filtered out in the form of a filter cake formed within an upright sieve basket, comprising:
   a. introducing liquid to be filtered into the top of a chamber within the upright sieve basket, said chamber being defined by a pressing means and a lower portion of said sieve basket where the filtrate is separated from the substances to be filtered out;
   b. continuously exerting pressure on the liquid in the sieve basket during step (a) by the pressing means so that the filtrate leaves the sieve basket and the entire top surface of the cake formed in the sieve basket from the filtered-out substances, at any given time, always has approximately a uniform height;
   c. increasing the pressure at which the liquid to be filtered is introduced into the chamber in response to build-up of the cake within the chamber and thereby increase the backpressure of the liquid in the chamber; and
   d. lifting the pressing means a small distance above the cake in the sieve basket by creating a backpressure of the liquid in the chamber which is higher than the pressure of the pressing means on the liquid to increase the height of the chamber and expose fresh areas of the sieve basket to liquid to be filtered so that the cake can grow in height.

2. A method as defined in claim 1 wherein the pressing means is used to press the cake out of the sieve basket.

3. Apparatus for continuously filtering liquids containing microorganisms, macromolecules and/or fine particles of solid matter as substances to be filtered out and collecting the substance comprising:
   a. a housing having a shell, a bottom cover closing the bottom of the shell, and a top cover closing the top of the shell,
   b. a sieve basket mounted in the housing for receiving the liquid to be filtered in the interior of the sieve basket, the sieve basket being open at its top and bottom and situated at the bottom of the housing, the sieve basket forming a filtrate chamber with the housing,
   c. an axially movable disc mounted in the sieve basket and dividing the interior of the sieve basket into a lower chamber which receives the liquid to be filtered and an upper chamber which is sealed from the lower chamber, said disc having a bore for passage of the liquid to be filtered into the lower chamber,
   d. an inlet line entering into and mounted in the housing, said inlet being connected to the bore for bringing the liquid to be filtered into the lower chamber of the sieve basket through the bore; and
   e. force applying means within the upper chamber acting on the disc which together with the disc comprises a pressing means which exerts pressure on the liquid in the lower chamber of the sieve basket.

4. Apparatus as defined in claim 3 wherein a valve is mounted in the bore to prevent liquid and filtered substances in the lower chamber from entering the inlet line when the backpressure of the liquid and the filtered substances in the lower chamber of the sieve basket is equal to or higher than the pressure exerted by the pressing means.

5. Apparatus as defined in claim 3 wherein the disc is mounted in the sieve basket on bearings.

6. Apparatus as defined in claim 5 wherein the disc has outer dimensions which approximately correspond to the inner dimensions of the sieve basket, and the bearings for the disc are guide elements, which run in guide grooves in the side wall of the sieve basket.

7. Apparatus as defined in claim 6 wherein the bearings are rollers or pins.

8. Apparatus as defined in claim 3 wherein the housing contains a shoulder at its lower end, the sieve basket has a collar disposed around its lower opening, a seal is mounted on the cover, and said collar contacts said shoulder and seal so that the filtrate chamber is separated and sealed from the interior of the sieve basket between the disc and the bottom cover of the housing.

9. Apparatus as defined in claim 3 wherein spacers hold the sieve basket in the housing.

10. Apparatus as defined in claim 3 wherein a contact sensor is provided at the upper cover of the housing to stop the inflow of liquid at a given height of the filter cake and a contact pin is fastened to the disc to actuate the contact sensor.

11. Apparatus as defined in claim 3 wherein the lower cover of the housing is pivotally mounted to the shell and can be pivoted to expose the lower opening of the sieve basket.

12. Apparatus as defined in claim 3 wherein the disc has a lower edge which faces a collar at the lower end of the sieve basket and a shield for sealing the lower chamber from the upper chamber is fastened to said lower edge.

13. Apparatus as defined in claim 12 wherein a circular scraper is provided at the lower edge of the disc.

14. Apparatus as defined in claim 3 wherein the pressing means includes the disc and the force applying means is attached to the upper cover of the housing.

15. Apparatus as defined in claim 14 wherein the force applying means is a spring or a hydraulic plunger or a telescoping member.

16. Apparatus as defined in claim 3 wherein a center screen is fastened in the sieve basket, the disc is provided with an additional opening through which the center screen passes, and a shield and a scraper for the center screen are arranged around the additional opening in the disc.

17. Apparatus as defined in claim 3 wherein a control valve is mounted in the inlet line.

18. Apparatus as defined in claim 3 wherein the disc is made of steel.

19. Apparatus as defined in claim 3 wherein the disc is made of a heavy material.

20. Apparatus as defined in claim 3 including a magnetic lock to close the lower cover of the housing.

21. Apparatus as defined in claim 3 including rinsing elements to clean the sieve basket.

* * * * *